US009138911B2

(12) United States Patent
Takizawa

(10) Patent No.: US 9,138,911 B2
(45) Date of Patent: Sep. 22, 2015

(54) CONTROL METHOD, CONTROL DEVICE AND PROCESSING APPARATUS

(75) Inventor: Takemi Takizawa, Nagano (JP)

(73) Assignee: MIMAKI ENGINEERING CO., LTD., Nagano (JP)

( * ) Notice: Subject to any disclaimer, the term of this patent is extended or adjusted under 35 U.S.C. 154(b) by 474 days.

(21) Appl. No.: 13/490,432

(22) Filed: Jun. 6, 2012

(65) Prior Publication Data

US 2012/0312854 A1 Dec. 13, 2012

(30) Foreign Application Priority Data

Jun. 10, 2011 (JP) ................................ 2011-130178

(51) Int. Cl.

| | |
|---|---|
| ***G06F 19/00*** | (2011.01) |
| ***G03G 15/00*** | (2006.01) |
| ***B65H 16/00*** | (2006.01) |
| ***G03B 1/22*** | (2006.01) |
| ***B26D 5/22*** | (2006.01) |
| ***B26F 1/38*** | (2006.01) |
| ***B26D 5/00*** | (2006.01) |
| ***B41J 11/36*** | (2006.01) |
| ***B41J 15/04*** | (2006.01) |
| ***B65H 20/02*** | (2006.01) |
| ***B65H 20/24*** | (2006.01) |

(52) U.S. Cl.

CPC ................ *B26F 1/3813* (2013.01); *B26D 5/00* (2013.01); *B41J 11/36* (2013.01); *B41J 15/04* (2013.01); *B65H 20/02* (2013.01); *B65H 20/24* (2013.01); *B65H 2301/51512* (2013.01); *B65H 2403/942* (2013.01); *B65H 2404/143* (2013.01); *B65H 2511/112* (2013.01); *B65H 2801/12* (2013.01)

(58) Field of Classification Search

CPC .............. B26D 5/00; B26F 1/38; B41J 11/36; B41J 15/04; B65H 20/02; B65H 20/36

USPC .................. 700/114; 83/208, 209; 226/1, 49; 399/385

See application file for complete search history.

(56) References Cited

U.S. PATENT DOCUMENTS

| | | | | | |
|---|---|---|---|---|---|
| 4,739,364 | A * | 4/1988 | Goryohara | .................... | 399/385 |
| 5,758,248 | A * | 5/1998 | Yoshiuchi et al. | ............ | 399/385 |
| 5,951,180 | A * | 9/1999 | Kawaura | ...................... | 400/629 |
| 6,722,238 | B2 * | 4/2004 | Shinga | .............................. | 83/63 |
| 8,070,151 | B2 * | 12/2011 | Lee et al. | .................... | 271/4.02 |

FOREIGN PATENT DOCUMENTS

JP 2004-122632 4/2004

* cited by examiner

*Primary Examiner* — Mohammad Ali

*Assistant Examiner* — Md Azad

(74) *Attorney, Agent, or Firm* — Jianq Chyun IP Office

(57) ABSTRACT

The control circuit controls the plotter provided with the feeding means for feeding out a roll paper and the processing means for processing the roll paper which is fed out by the feeding means. The control circuit includes the feeding control section which controls the feeding means so that, before the processing means starts processing on one page of the roll paper, a plurality of pages including the one page is fed out in advance and then, the page having been fed out in advance is pulled back and retreated at a position on an upstream side with respect to a processing position of the processing means, and the processing control section which controls the processing means so that processing of the one page is started when an elapsed time of the one page having been fed out in advance has reached a predetermined stand-by time.

7 Claims, 6 Drawing Sheets

CONTROL METHOD, CONTROL DEVICE AND PROCESSING APPARATUS

CROSS-REFERENCE TO RELATED APPLICATIONS

This application claims the priority benefit of Japan application serial no. 2011-130178, filed on Jun. 10, 2011. The entirety of the above-mentioned patent application is hereby incorporated by reference herein and made a part of this specification.

TECHNICAL FIELD

The present invention relates to a processing apparatus in which a medium to be processed is fed out and is processed and to a control method and a control device for controlling the processing apparatus.

BACKGROUND ART

A cutting plotter, a printer and the like have been conventionally known as a processing apparatus which performs processing such as printing or cutting on a sheet-like medium such as a paper or a film which is to be processed (hereinafter, referred to as a "processing medium").

For example, in the apparel industry, a cutting plotter is utilized as a processing apparatus for cutting out a desired form from a processing medium. The cutting plotter feeds out a roll paper which is wound around in a rolled state and cuts out a directed form from the roll paper having been fed out.

It has been known that a processing medium used in a cutting plotter or the like is deformable according to its used environment. For example, a roll paper which is used in a cutting plotter or the like has a property that, when fed out and exposed to the outside air, the roll paper expands and contracts under the influence of its temperature and humidity. When the expansion and contraction of a roll paper is occurred in the processing, processing accuracy is lowered. Therefore, it is a conventional problem how the expansion and contraction of a roll paper is prevented.

For example, in Patent Literature 1 described below, in an inkjet printer, a technique is disclosed that, when it is judged that a paper kink is occurred in a printing tape based on various conditions such as a temperature and humidity, the printing tape is idly fed automatically. According to this technique, a portion of a printing tape where a paper kink may be occurred is idly fed automatically and thus it may be attained that printing is always performed on a printing tape in a satisfactory state.

CITATION LIST

Patent Literature

[Patent Literature 1] Japanese Patent Laid-Open No. 2004-122632

SUMMARY OF INVENTION

Technical Problem

However, in the technique described in Patent Literature 1, the portion in which a paper kink is judged to occur is idly fed automatically and thus the portion of a printing tape is not used for printing and therefore the printing tape is used wastefully.

In order to prevent this problem, conventionally, in a cutting plotter and the like, a method has been adopted in which a processing medium has been fed out in advance for fitting the processing medium to the environment and then the processing medium is used so as not to use the processing medium wastefully like a technique as described in Patent Literature 1.

For example, in a cutting plotter and the like, a method has been known in which paper having a length required for processing is automatically fed out just before performing a processing such as printing or cutting and, after the paper is stood by for a certain time so that the paper is fitted to the environment, the processing is performed.

In this method, the paper to be processed is required to fit to the environment as described above each time processing is to be performed and thus, in a case that processing is successively performed, the processing time is required to be longer.

Further, in a cutting plotter and the like, a method has been known in which a user feeds out paper having a length longer than required manually in advance before processing such as printing or cutting is performed and, after the paper is allowed to stand by for a certain time so that the paper is fitted to the environment, the processing is performed.

In this method, having a length longer than required which is fed out by a user is bulky and thus, the paper may be folded at a standby position during a standby state to cause folds and wrinkles or malfunction may occur in a feeding operation of the paper.

In view of the problems described above, an objective of the present invention is to prevent deterioration of processing accuracy of the processing apparatus without occurring wasteful consumption of a processing medium and without increasing the processing time.

Solution to Problem

In order to attain the above-mentioned objective, the present invention provides a control method for controlling a processing apparatus which is provided with a feeding means for feeding out a processing medium in a sheet-like shape and a processing means for processing the processing medium having been fed out by the feeding means. The control method includes a feeding control process which controls the feeding means so that, before the processing means starts processing on one processing range of the processing medium, a plurality of processing ranges including the one range is fed out in advance and then, the processing range having been fed out in advance is pulled back and retreated at a position on an upstream side with respect to a processing position by the processing means, and a processing control process which controls the processing means so that processing of the one range is started when an elapsed time for the one range having been fed out in advance reaches a predetermined stand-by time.

According to the present invention, after each of a plurality of processing ranges is fitted to the environment, the processing for the corresponding processing range is started. Therefore, the corresponding processing range does not expand and contract due to influence of the environment during the processing on the corresponding processing range and thus deterioration of processing accuracy of the processing apparatus can be prevented.

Especially, in the present invention, since a plurality of processing ranges is fed out in advance, other processing ranges can be fitted to the environment during one processing range is processed. In other words, the processing on the one processing range and fitting of another processing range to the environment can be performed in a parallel manner. Therefore, since the timing to start processing on another processing range can be further advanced, increase of a processing time by the processing apparatus can be restrained.

When one processing range is to be processed, other processing ranges having been fed out in advance are required to be retreated somewhere so as not to disturb the processing. However, according to the present invention, the processing ranges having been fed out in advance can be retreated at a position on an upstream side with respect to the processing position of the processing means by a simple control in which the processing ranges having been fed out in advance are pulled back.

As described above, when the processing range is retreated at a position on an upstream side, the processing range is hard to be influenced from the outside of the apparatus during being retreated and thus the processing medium can be maintained in a satisfactory state and deterioration of processing accuracy of the processing apparatus can be prevented.

In addition, according to the present invention, the retreated processing range is not pulled back and returned to its original state before the corresponding processing range is fed out. For example, when the retreated processing range is a processing range having been fed out from a wound portion in a rolled state, the processing range is not rewound in a rolled state during being retreated. Therefore, even in a retreated state, the processing range is continuously exposed to the outside air and the stand-by time is passing.

In the above-mentioned control method, it is preferable that, in the feeding control process, the feeding means is controlled so that the processing range having been fed out in advance is pulled back and retreated in a slackened state without being folded at an upstream position with respect to the processing position of the processing means.

Folds and wrinkles may easily occur in the sheet-like processing medium especially when the sheet-like processing medium is folded. However, according to the above-mentioned structure, since the processing range is retreated in a slackened state without being folded and thus folds and wrinkles do not occur during the processing range is retreated.

In the above-mentioned control method, it is preferable that the control method further includes a measurement process in which an elapsed time after the processing range is fed out in advance in the feeding control process is measured for each of a plurality of processing ranges having been fed out in advance and, in the processing control process, the processing means is controlled so that, for each of a plurality of the processing ranges, when the elapsed time for the corresponding processing range reaches the stand-by time, the processing for the corresponding processing range is started.

According to this structure, since an elapsed time is measured for each of a plurality of the processing ranges, the elapsed time after each of a plurality of the processing ranges is fed out in advance can be obtained accurately. For example, even when there is a difference of times when a plurality of processing ranges is fed out or, even when stand-by times for respective processing ranges are different from each other, the elapsed time after fed out can be obtained accurately for each of a plurality of the processing ranges. Therefore, the excess and deficiency of the stand-by time is not occurred for each of a plurality of the processing ranges and thus the processing medium is prevented from being deformed during processing and is prevented from being wastefully stood by for a long time.

In the above-mentioned control method, it is preferable that the control method further includes a first setting process in which a user sets the stand-by time and, in the processing control process, the processing means is controlled so that, when the elapsed time for the corresponding processing range reaches the predetermined stand-by time set by the user, processing for the corresponding processing range is started.

The stand-by time which is required for fitting the processing medium to the environment is varied according to a temperature and humidity of the environment and various conditions such as material, thickness, length and the like of the processing medium.

Therefore, according to this structure, a user may set an appropriate stand-by time in consideration of the various conditions. Accordingly, the excess and deficiency of the stand-by time is not occurred and thus the processing medium is prevented from being deformed during processing and is prevented from being wastefully stood by for a long time.

Further, in the above-mentioned control method, it is preferable that the control method further includes a second setting process in which the number of processing ranges fed out in advance in the feeding control process is set by a user and, in the feeding control process, the feeding means is controlled so that the processing ranges are fed out in advance by a predetermined number of the processing ranges set by the user.

When the number of processing ranges which are fed out in advance is increased, more processing ranges can be quickly fitted to the environment. However, when the number of processing ranges which are fed out in advance is increased, the total length of the processing medium which is fed out in advance becomes longer. When the total length is too long, the processing medium having been fed out may be folded to cause folds and wrinkles to occur or malfunction in a feeding operation of the paper may be occurred.

In order to prevent these problems, according to this structure, a user can set an appropriate number of processing ranges depending on a shape and size of space at a standby position for the processing medium having been fed out. Therefore, the total length of the processing medium having been fed out in advance is prevented from being too long and thus the processing medium having been fed out is prevented from being folded and the like and thus folds and wrinkles or malfunction in a feeding operation of the paper are not occurred.

Further, in the above-mentioned control method, it is preferable that the control method further includes a third setting process in which a length of a processing range fed out in advance in the feeding control process is set by a user and, in the feeding control process, the feeding means is controlled so that a processing range having the length set by the user is fed out in advance.

Even when the number of processing ranges which are fed out in advance is set to be minimized, in a case that a length of the processing range is too long, the processing medium having been fed out may be folded or the like to cause folds and wrinkles to occur or malfunction in a feeding operation of the paper may be occurred.

In order to prevent these problems, according to this structure, a user is capable of setting an appropriate length of a processing range depending on a shape and size of space at a standby position for the processing medium having been fed out. In this case, the processing medium may be fed out in advance only up to the middle of a processing range. However, the total length of the processing medium fed out in advance is prevented from being too long and thus the processing medium having been fed out is prevented from being folded or the like and folds and wrinkles or malfunction in a feeding operation of the paper are not occurred.

Further, the control device in accordance with the present invention is a control device for controlling a processing apparatus having a feeding means for feeding out a sheet-like processing medium and a processing means for processing the processing medium having been fed out by the feeding means. The control device includes a feeding control means which controls the feeding means so that, before the processing means starts processing on one processing range of the processing medium, a plurality of processing ranges including the one processing range is fed out in advance and then, the processing range having been fed out in advance is pulled back and retreated at a position on an upstream side with respect to a processing position by the processing means, and a processing control means which controls the processing means so that processing of the one processing range is started when an elapsed time of the one processing range having been fed out in advance reaches a predetermined stand-by time.

According to the present invention, similar effects to the above-mentioned control method can be obtained by the control device.

Further, the processing apparatus in accordance with the present invention includes a feeding means for feeding out a sheet-like processing medium, a processing means for processing the processing medium having been fed out by the feeding means, and the above-mentioned control device.

According to the present invention, similar effects to the above-mentioned control device can be obtained by the processing apparatus in itself.

Advantageous Effects of Invention

According to the control method, the control device and the processing apparatus in accordance with the present invention, after the processing range is fitted to the environment for each of a plurality of the processing ranges, the processing for the corresponding processing range can be started. Especially, in the present invention, since a plurality of the processing ranges is fed out in advance before one processing range is processed, another processing range can be fitted to the environment during the one processing range is processed. In addition, in the present invention, the processing range can be retreated at an upstream position with respect to the processing position by the processing means. As a result, increase of the processing time by the processing apparatus can be restrained while preventing deterioration of the processing accuracy of the processing apparatus.

DESCRIPTION OF EMBODIMENTS

Embodiments of the present invention will be described below with reference to the accompanying drawings.

Schematic Structure of Plotter 100

Figure 1:
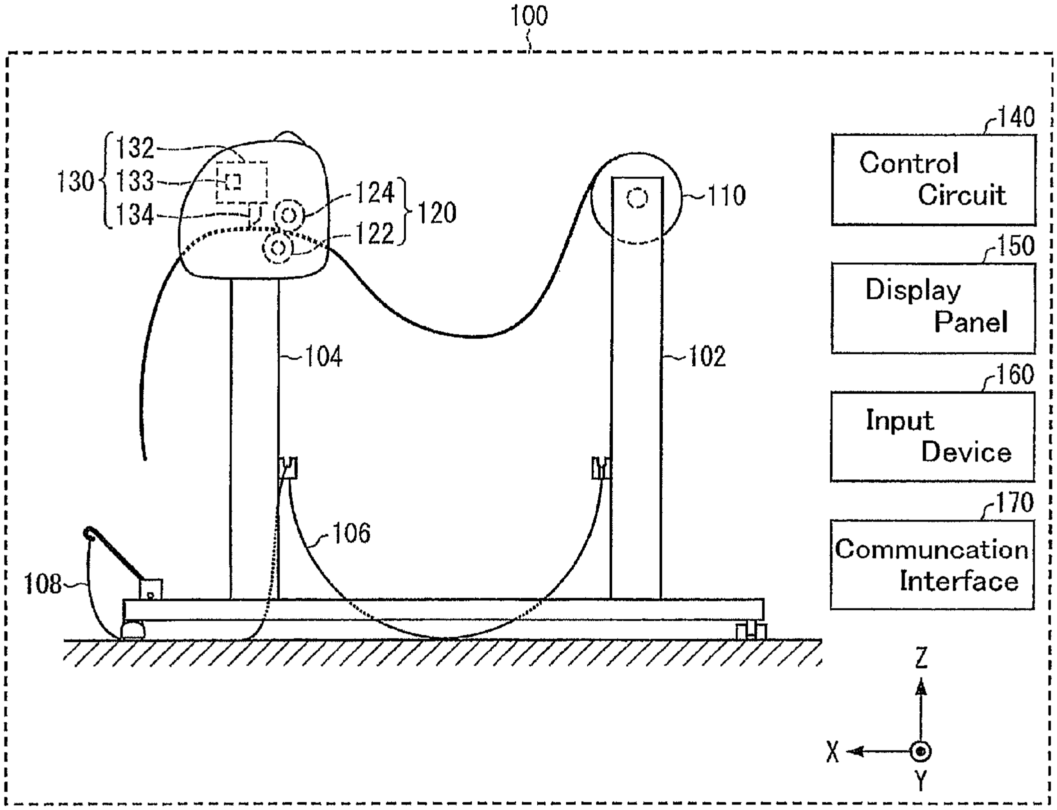
FIG. 1 is a view showing a structure of a plotter in accordance with an embodiment of the present invention.

First, a structure of a plotter 100 in accordance with an embodiment of the present invention will be described below. FIG. 1 is a view showing a structure of the plotter 100 in accordance with an embodiment of the present invention.

The plotter 100 is an example of a processing apparatus in accordance with the present invention and is an apparatus in which a form directed by processing data is cut out from a paper in a sheet-like shape which is wound around in a rolled state (hereinafter, referred to as a "roll paper"). In other words, the plotter 100 is a so-called cutting plotter.

Especially, the plotter 100 in this embodiment is a so-called friction type plotter in which, while a cutting edge of a cutter is pressed against a roll paper, the roll paper is fed out in an "X"-axis direction (a direction in which the roll paper is fed out, in other words, a length direction of the roll paper) and, simultaneously the cutter is moved in a "Y"-axis direction (a direction perpendicular to the direction in which the roll paper is fed out, in other words, a widthwise direction of the roll paper) and thereby a form is cut out.

Structure of Plotter 100

As shown in FIG. 1, the plotter 100 includes a roll paper 110, a feeding means 120, a processing means 130, a basket 106, a basket 108, and a control circuit 140.

The roll paper 110 is an example of a processing medium in a sheet-like shape in the present invention and is wound around in a rolled state.

The plotter 100 includes a pair of support posts 102. A pair of the support posts 102 is erected so as to have a certain distance between them in the "Y"-axis direction. The roll paper 110 is held so that both ends are pivotally supported by a pair of the support posts 102 in upper parts of the support posts 102. As a result, the roll paper 110 is allowed to be successively fed out in the "X"-axis direction while a portion wound around in a rolled state is turned.

The plotter 100 includes a pair of support posts 104. A pair of the support posts 104 is erected so as to have a certain distance between them in the "Y"-axis direction at positions separated to some extent from the support posts 102 in the "X"-axis direction. The feeding means 120 and the processing means 130 are provided at an upper part between a pair of the support posts 104. Especially, the feeding means 120 is provided on an upstream side (support post 102 side) in the "X"-axis direction with respect to the processing means 130.

The feeding means 120 feeds out and pulls back the roll paper 110 by feeding the roll paper 110.

Specifically, the feeding means 120 includes a grit roller 122 and a pinch roller 124. The grit roller 122 and the pinch roller 124 are oppositely disposed to each other. The roll paper 110 is sandwiched between the grit roller 122 and the pinch roller 124.

The grit roller 122 mainly serves to feed the roll paper 110. On the other hand, the pinch roller 124 mainly serves to press the roll paper 110 to the grit roller 122. The grit roller 122 is rotated in a positive direction/reverse direction by driving a drive motor (not shown). Therefore, the feeding means 120 is structured so that the roll paper 110 is fed out/pulled back by respective outer peripheral faces of the grit roller 122 and the pinch roller 124.

The processing means 130 cuts out a form directed by processing data from the roll paper 110 which is fed out by the feeding means 120. In other words, the processing means 130 performs a so-called cutting processing on the roll paper 110.

Specifically, the processing means 130 includes a carriage 132, a guide rail 133 and a cutter 134.

The cutter 134 is held by the carriage 132 so that its cutting edge is protruded from an under side of the carriage 132.

The guide rail 133 is a member which is extended in the "Y"-axis direction. The carriage 132 is fitted to the guide rail 133.

The carriage 132 can be moved along the guide rail 133 in the "Y"-axis direction by driving a drive motor (not shown). In the processing means 130, a cutting position in the "Y"-axis direction by the cutter 134 is determined by movement in the "Y"-axis direction of the carriage 132.

The cutter 134 can be further moved in the "Z"-axis direction (upper and lower direction). When the cutter 134 is moved downward, its cutting edge is pressed against the roll paper 110 to be capable of cutting the roll paper 110. On the other hand, when the cutter 134 is moved upward, its cutting edge and the roll paper 110 are separated from each other and thus, moving of the cutter 134 and feeding of the roll paper 110 can be performed without cutting the roll paper 110.

The baskets 106 and 108 are an example of a receiving means for receiving the roll paper. In this example, the baskets 106 and 108 are provided with a sheet-like member which is stretched by holding their both ends and are structured to receive the roll paper by an upper face of the sheet-like member.

The basket 108 is provided on an outer side in the "X"-axis direction with respect to the support post 104 and is structured to receive the roll paper 110 (in other words, the roll paper 110 ejected after the processing has finished), which is further fed out from the processing position by the processing means 130, on its upper face.

On the other hand, the basket 106 is provided between the support posts 104 and the support posts 102 and is structured to receive the roll paper 110 which is pulled back to the upstream side with respect to the processing position (in other words, the roll paper 110 which has been retreated) on its upper face.

The control circuit 140 is structured of a CPU (Central Processing Unit), a ROM (Read Only Memory), a RAM (Random Access Memory) and the like and controls respective parts of the plotter 100 by making the CPU execute programs recorded in the ROM, the RAM and the like.

For example, the control circuit 140 controls the drive motor for driving the grit roller 122 and thereby a feeding-out amount/a pulling-back amount of the roll paper 110 and a cutting position in the "X"-axis direction by the cutter 134 are controlled.

Further, the control circuit 140 controls the drive motor for driving the carriage 132 and thereby a cutting position in the "Y"-axis direction by the cutter 134 is controlled.

The plotter 100 also includes a display panel 150, an input device 160, a communication interface 170 and the like.

The display panel 150 indicates various informations. For example, a setting screen for allowing a user to perform various settings and the like are displayed on the display panel 150.

Various informations are inputted through the input device 160 by being operated by a user. For example, buttons, keys, a touch panel and the like are used as the input device 160. Further, information inputted through the input device 160 includes, for example, set values for performing various settings.

The communication interface 170 controls data communication with the outside. The plotter 100 can be received with processing data from the outside by data communication with the outside through the communication interface 170.

Processing data are data which represent processing contents. In this embodiment, CAD (Computer Aided Design) data are adopted as an example of the processing data. The CAD data are created by CAD software or the like and a shape of the form which is cut out is represented by vector data.

In accordance with an embodiment of the present invention, processing data may be inputted into the plotter 100 through a portable recording medium (memory card or the like) other than the communication interface 170.

Basic Operation

In the Plotter 100 structured as described above, when CAD data are inputted from an external device, the feeding means 120 feeds out the roll paper 110 having a necessary length for cutting out a form directed by the processing data under control of the control circuit 140. Then, the processing means 130 cuts out the form from the roll paper 110 having been fed out under the control of the control circuit 140.

In the CAD data, the processing content is represented in a page unit. In other words, in this embodiment, a range to be processed (processing range) of the roll paper 110 in the "X"-axis direction is set per page. Therefore, the feeding means 120 and the processing means 130 perform feeding and processing of the roll paper 110 by pages.

For example, after processing on the first page is performed, the first page is ejected and then processing on the second page is started.

The plotter 100 is provided with an automatic cutting function and, when processing on one page is finished in a state that this function is "ON", the page is automatically separated from the roll paper 110 and ejected.

As a tool of the processing means 130, various pens such as a mechanical pencil, an ink pen and a ball-point pen may be adopted other than a cutter. In this case, pens whose leads are different from each other in thickness and in color may be adopted. When a pen is adopted as a tool of the processing means 130, the plotter 100 functions as a so-called pen plotter in which a form directed by CAD data is printed on the roll paper.

Previous Feed Function

The plotter 100 is provided with a previous feed function. The previous feed function is a function that, in a case that one page of the roll paper 110 is to be processed, the one page is fed out in advance and the processing of the one page is started after a predetermined stand-by time has passed without immediately starting the processing of the roll paper 110. Therefore, in the plotter 100, after a page to be processed of the roll paper 110 is fitted to the environment in advance, the processing of the page is started.

The stand-by time is a time period which is required after a page to be processed is fed out and until the page having been fed out is fitted to the environment. The time period that the roll paper 110 requires to fit to the environment varies according to various conditions such as material, length and thickness of the roll paper 110 and ambient temperature and humidity. Therefore, an appropriate time period is set in the plotter 100 as the stand-by time depending on the various conditions.

For example, the plotter 100 adopts a time period as the stand-by time which is set by a user through the input device 160. Alternatively, the plotter 100 may store stand-by times for various conditions in advance and automatically determine a stand-by time to be adopted out of stored stand-by times based on various conditions set by a user through the input device 160.

In the plotter 100, the processing of a page to be processed is started after the page is fitted to the environment by the previous feed function and thus material of the page is prevented from expanding and contracting during the processing of the page. Therefore, deterioration of processing accuracy by the processing means 130 can be prevented.

Over-Feed Function

In addition, the plotter 100 is provided with an over-feed function. The over-feed function is a function in which, before the processing on one page to be processed is finished, another page succeeding the one page is fed out for the previous feed function.

In the plotter 100, another page succeeding one page is fed out in advance without waiting for finishing of the processing on the one page by the over-feed function and thus the another page can be fitted to the environment in advance. Therefore, the timing when the processing of another page is started can be further advanced and thus increase of the processing time by the processing means 130 can be restrained.

Especially, in the plotter 100 according to this embodiment, a structure is adopted that a plurality of pages including a first one page is fed out before the processing of the first one page is started and thus other pages can be fitted to the environment in advance during the processing of the first one page is performed. Therefore, the timing when processing of the succeeding page is started can be further advanced and thus increase of the processing time by the processing means 130 can be further restrained.

The purpose for "feeding out" in this embodiment includes exposing the roll paper to the outside air as described above and thus the meaning of "feeding out" includes a portion of the roll paper 110 where at least the roll paper 110 is separated from the rolled portion. In other words, in a case that an apparatus main body is covered by a cover and the roll paper 110 is not exposed to the outside of the apparatus main body, when the roll paper 110 is separated from the rolled portion even slightly, the separated portion corresponds to a portion of the roll paper 110 which is "fed out".

Functional Structure of Control Circuit 140

Figure 2:
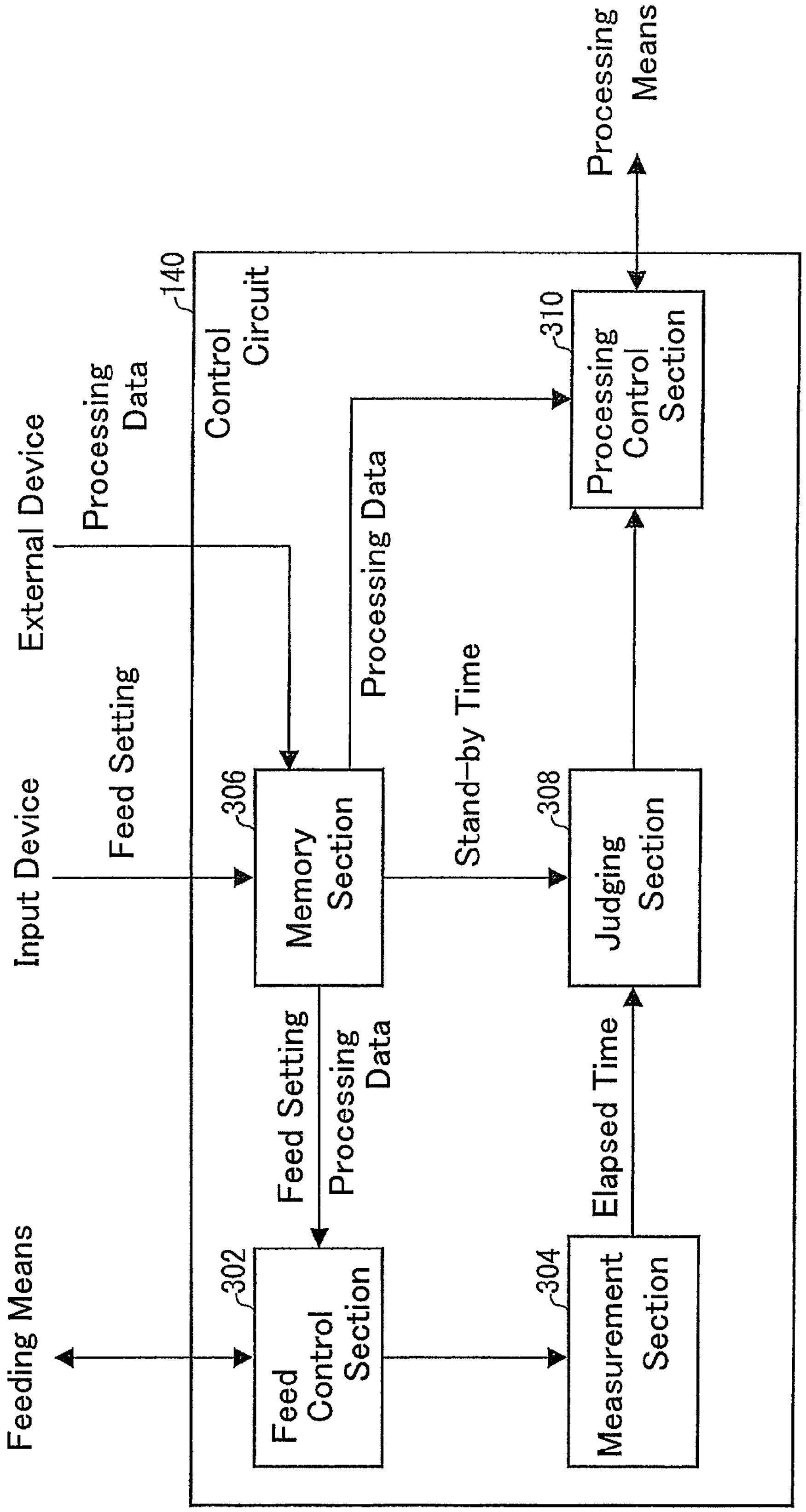
FIG. 2 is a block diagram showing a functional structure of a control circuit which is provided in a plotter in accordance with an embodiment of the present invention.

Next, a functional structure of the control circuit 140 provided in the plotter 100 will be described below. FIG. 2 is a block diagram showing a functional structure of a control circuit 140 which is provided in the plotter 100 in accordance with an embodiment of the present invention.

As shown in FIG. 2, the control circuit 140 includes a feed control section 302, a measurement section 304, a memory section 306, a judging section 308 and a processing control section 310.

Memory Section 306

The memory section 306 stores feed settings which are set through an operation of the input device 160 or the like. Further, the memory section 306 stores CAD data inputted through an external device. The feed settings include ON/OFF of the previous feed function, ON/OFF of the over-feed function, a stand-by time, the number of pages which are to be previously fed, and a length of one page (page length) which is to be previously fed, and the like.

Feed Control Section 302

The feed control section 302 controls feeding out and pulling back of the roll paper 110 by the feeding means 120.

Specifically, the feed control section 302 controls feeding out and pulling back of the roll paper 110 by the feeding means 120 for determining a processing position of the roll paper 110 when a designated form is cut out according to CAD data stored in the memory section 306.

Further, the feed control section 302 controls, when the previous feed function is turned "ON", feeding out and pulling back of the roll paper 110 by the feeding means 120 for previously feeding the roll paper 110 according to the feed settings which are stored in the memory section 306.

Measurement Section 304

The measurement section 304 measures an elapsed time after one page is previously fed out when the one page of the roll paper 110 is to be fed out in advance by the previous feed function.

Judging Section 308

The judging section 308 judges whether an elapsed time measured by the measurement section 304 has reached to the stand-by time which is stored in the memory section 306 or not.

Processing Control Section 310

The processing control section 310 controls the processing of the roll paper 110 by the processing means 130. For example, when the roll paper 110 is to be processed by the processing means 130, the processing control section 310 controls start timing, a processing position, a moving speed of the tool, pressure of the tool and the like.

Previous Feed Function

In the plotter 100 structured as described above, when the previous feed function is in an "ON" state, the feed control section 302 controls the feeding means 120 so that a first page of the roll paper 110 is fed out in advance before the processing means 130 starts the processing of the first page.

Further, the processing control section 310 controls the processing means 130 so that, when the elapsed time for the first page which is fed out in advance does not reach the stand-by time, the processing means 130 stands by without starting the processing of the first page and, when the elapsed time has reached the stand-by time, the processing means 130 starts the processing of the first page.

Over-Feed Function

In addition, when the over-feed function is in an "ON" state, the feed control section 302 controls the feeding means 120 so that a plurality of pages including the first page is fed out in advance before the processing means 130 starts processing of the first page of the roll paper 110.

In this case, the measurement section 304 measures elapsed times after the respective pages are fed out for each of a plurality of the pages which are fed out in advance by the feeding means 120. For example, it is assumed that the first page and the second page of the roll paper 110 are fed out by the over-feed function. In this case, the measurement section 304 starts measurement of an elapsed time for the first page at the timing when the first page of the roll paper 110 is fed out and the measurement section 304 starts measurement of an elapsed time for the second page at the timing when the second page of the roll paper 110 is fed out.

Further, the processing control section 310 controls the processing means 130 so that, when the elapsed time for each of the respective pages which are fed out in advance does not reach the stand-by time, the processing means 130 stands by without starting the processing of the corresponding page and, when the elapsed time has reached the stand-by time, the processing means 130 starts the processing of the corresponding page.

For example, when an elapsed time for the first page has reached the stand-by time, the processing control section 310 controls the processing means 130 so that processing on the first page is started and, after the processing on the first page is finished, when an elapsed time for the second page has reached the stand-by time, the processing control section 310 controls the processing means 130 so that processing on the second page is started.

In other words, in a case that an elapsed time for the second page has reached the stand-by time at a time when the processing on the first page is finished, the processing control section 310 controls the processing means 130 so that processing on the second page is started immediately. Further, in a case that an elapsed time for the second page does not reach the stand-by time at the time when the processing on the first page is finished, the processing control section 310 controls the processing means 130 so that processing on the second page is started after the elapsed time reaches the stand-by time.

In this embodiment, the plotter 100 allows a user to set the stand-by time which is used in the above-mentioned operation. Further, the processing control section 310 is capable of controlling the processing means 130 so that, when the elapsed time for each of the respective pages which are fed out in advance does not reach the stand-by time which is set by a user, the processing means 130 stands by without starting the processing of the corresponding page and, when the elapsed time reaches the stand-by time, the processing means 130 starts the processing of the corresponding page.

Further, in this case, the plotter 100 allows a user to set the number of pages which are to be fed out in advance by the feeding means 120. In addition, the feed control section 302 is capable of controlling the feeding means 120 so that a range to be processed having the number of pages set by the user is fed out in advance.

Further, in this case, the plotter 100 allows a user to set a length of a page which is fed out by the feeding means 120. Further, the feed control section 302 is capable of controlling the feeding means 120 so that a page having a predetermined length set by the user is fed out in advance.

For example, it is assumed that "10 minutes" are set as the stand-by time, "two pages" are set as the number of pages, and "3 m" is set as the length. In this case, before the processing means 130 starts processing on the first page, the feed control section 302 controls the feeding means 120 so that the roll paper 110 is fed out in advance by 6 m corresponding to a length which is a sum of a length (3 m) of the first page and a length (3 m) of the second page.

After the roll paper 110 is fed out in advance as described above, the processing control section 310 controls the processing means 130 so that the processing on the first page is started when the elapsed time for the first page has passed 10 minutes.

In addition, the processing means 130 is controlled so that, after the processing on the first page is finished, when the elapsed time for the second page has passed 10 minutes, the processing on the second page is started.

In a case that a plurality of pages is fed out in advance as described above, the first page is required to be pulled back to its processing position before the processing means 130 starts processing on the first page. Further, other pages of the second and subsequent pages are required to be retreated so as not to disturb the processing on the first page.

Therefore, the feed control section 302 controls the feeding means 120 so that, before the processing means 130 starts processing on the first page, a plurality of pages having been fed out is pulled back simultaneously and thereby the first page is pulled back to the processing position and the second and subsequent pages are retreated between the support post 104 and the support post 102.

In this case, the second and subsequent pages are not rewound to the rolled portion of the roll paper 110 and thus the second and subsequent pages are continuously exposed to the outside air during the stand-by time and the stand-by time is passing.

Especially, the feed control section 302 controls the feeding means 120 so that the second and subsequent pages are retreated in a slackened state without being folded. Therefore, for example, it is preferable that the feed control section 302 adjusts a length of the roll paper 110 to be retreated so that a slackened portion of the roll paper 110 retreated between the support post 104 and the support post 102 does not contact with something (for example, the basket 108) or, even when contacted, the slackened portion is not deformed largely.

For example, in the plotter 100 in accordance with this embodiment, respective heights of the support post 104 and the support post 102, a distance between the support post 104 and the support post 102, and the like are set in sizes so as to be capable of providing room to some extent. Further, in the plotter 100 in accordance with this embodiment, only a length in which a plurality of pages having been fed out in advance does not contact or deform is pulled back and retreated. Specifically, in the example described in FIG. 3 and the like, in the plotter 100 in this embodiment, when two pages are fed out in advance, only one page is pulled back so as not to occur the contact or the deformation.

In the plotter 100 in accordance with this embodiment, when the sizes such as the heights and the distance described above are provided with further room, all pages of a plurality of the pages having been fed out in advance (for example, two pages in the example described in FIG. 3 and the like) may be pulled back and retreated.

In addition, in the plotter 100 in this embodiment, the roll paper 110 may be pulled back and retreated in a unit except a page unit (for example, length).

As described above, a quantity which is pulled back and retreated for a plurality of pages having been fed out may be previously set in the plotter 100 or may be arbitrarily set by a user.

In this manner, in the plotter 100 in this embodiment, an appropriate length of the roll paper 110 having been fed out in advance is pulled back and temporarily retreated so that the contact or the deformation do not occur.

In accordance with another embodiment of the present invention, the plotter 100 may be structured so that a limit value of a length of the roll paper 110 which is capable of being fed out in advance is previously set in a range in which the contact or the deformation does not occur and, when a feed setting which exceeds the limit value is set, the feed setting is not allowed. Alternatively, the feed setting may be automatically adjusted so as not to exceed the limit value or a change of the feed setting may be required to a user. The limit value may be easily obtained by a person skilled in the art based on the respective heights of the support post 104 and the support post 102, the distance between the support post 104 and the support post 102 and the like. The limit value may be previously set in the plotter 100 or a user may set an arbitrary value as the limit value.

Steps of Processing in Plotter 100

Figure 3:
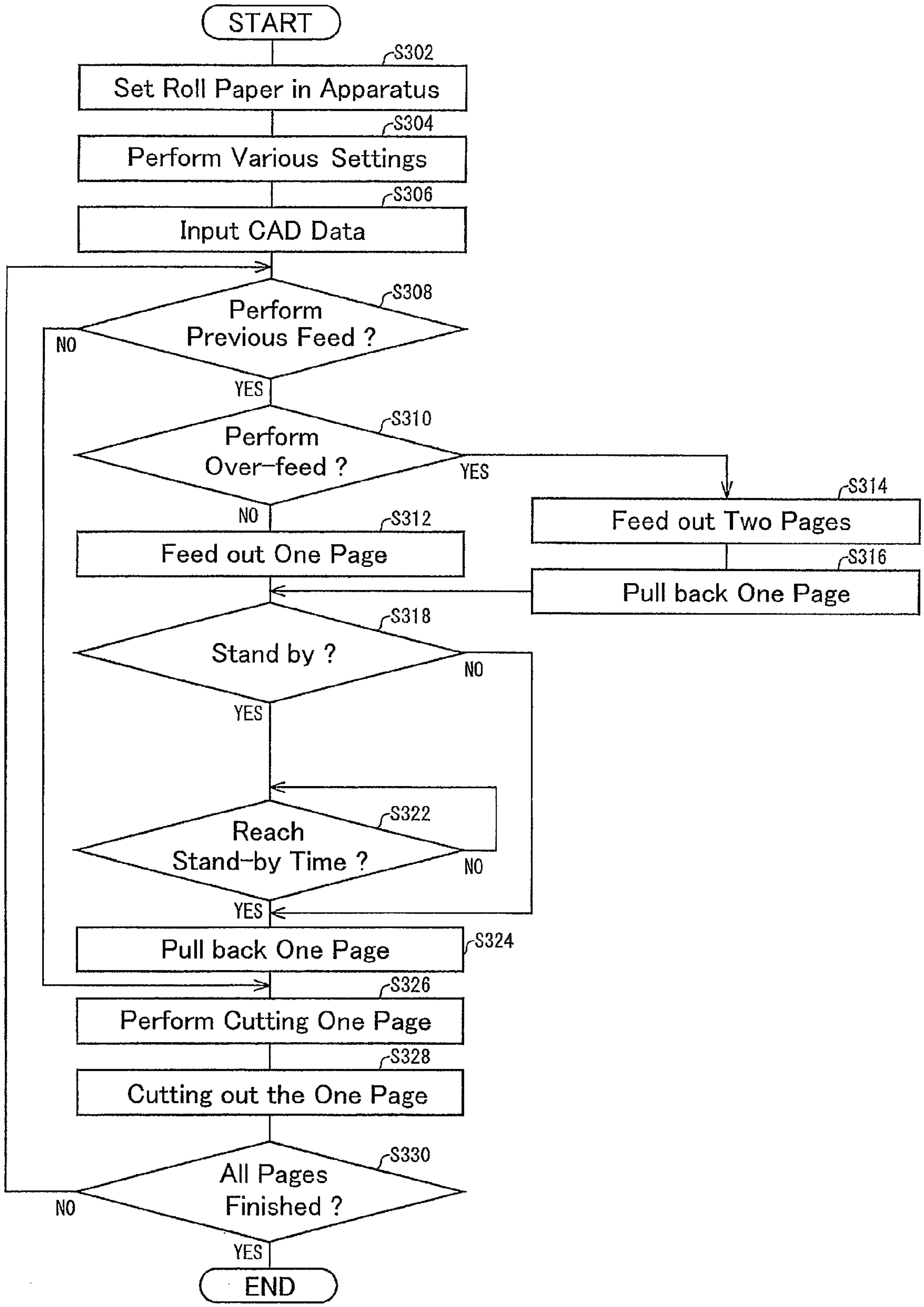
FIG. 3 is a flow chart showing steps of processing in a plotter in accordance with an embodiment of the present invention.

Next, steps of processing in the plotter 100 will be described below with reference to FIG. 3. FIG. 3 is a flow chart showing steps of processing in the plotter 100 in accordance with an embodiment of the present invention.

Preparation and Various Settings for Plotter 100

First, a user is required to perform preparation and various settings on the plotter 100 as follows before a cutting processing is performed by the plotter 100. The preparation and various settings may be omitted when having been already performed or when its change is not required.

First, a user sets a roll paper 110 in an apparatus main body of the plotter 100 (step S302). Specifically, in order to set the plotter 100 as shown in FIG. 1, after both ends of the roll paper 110 are held by the support posts 102, a tip end of the roll paper 110 is fed out appropriately so that the roll paper 110 is passed between the grit roller 122 and the pinch roller 124.

Next, the user performs various settings on the plotter 100 by operating the input device 160 while referring to information displayed on the display panel 150 (step S304). In this step, at least the feed setting is required to be performed. In this embodiment, the feed settings include ON/OFF of the previous feed function, ON/OFF of the over-feed function, a stand-by time, the number of pages which are to be previously fed, and a length of one page (page length) which is to be previously fed. In this embodiment, it is assumed that, as an example, "10 minutes" are set as the stand-by time, "two pages" are set as the number of pages which are to be previously fed, and "3 m" (three meter) is set as the length of one page which is to be previously fed by the user.

Further, the user inputs CAD data to the plotter 100 through an external device (step S306).

Various settings performed in the step S304 and the CAD data inputted in the step S306 as described above are stored in the memory section 306.

Processing by Plotter 100

After preparation and various settings are performed as described above, the plotter 100 performs the previous feed processing and a cutting processing as described below.

First, the plotter 100 refers to the feed setting stored in the memory section 306 and judges whether the previous feed is performed or not (step S308). In the step S308, when it is judged that the previous feed is not performed (step S308: No), the processing in the plotter 100 is proceeded to the step S326 and a cutting processing for the first page is performed according to the step S326 and subsequent steps.

On the other hand, when it is judged that the previous feed is performed (step S308: Yes), the processing in the plotter 100 is proceeded to the step S310 and the previous feed processing is performed according to the step S310 and subsequent steps.

Previous Feed Processing

In the step S310, the plotter 100 refers to the feed setting which is stored in the memory section 306 and judges whether the over-feed is performed or not (step S310).

In the step S310, when it is judged that the over-feed is not performed (step S310: No), the plotter 100 feeds out the roll paper 110 by one page by the previous feed function and starts to measure an elapsed time after the first page is fed out (step S312) and the processing is proceeded to the step S318.

On the other hand, in the step S310, when it is judged that the over-feed is performed (step S310: Yes), the plotter 100 feeds out the roll paper 110 by two pages (in other words, by the number of pages set in the feed setting) by the over-feed function and starts to measure elapsed times for the respective pages after the respective pages are fed out (step S314). Further, in the plotter 100, the roll paper 110 is pulled back and retreated by one page (in other words, the number of pages which is obtained by subtracting one page from the number of pages set in the feed setting) (step S316) of the roll paper 110 which is fed out in the step S314 and the processing is proceeded to the step S318.

In the step S318, the plotter 100 judges whether the plotter 100 stands by until the roll paper 110 is fitted to the environment or not (step S318). For example, in the roll paper 110 having been fed out in the step S314, when the elapsed time for the first page on which a cutting processing is to be performed next has already passed the stand-by time of "10 minutes", the plotter 100 judges that the plotter 100 does not stand by.

In the step S318, in a case that it is judged that the plotter 100 does not stand by, the plotter 100 pulls back the first page (step S324) so that a tip end position (or some reference position) of the first page is moved to a predetermined preparation position in the vicinity of the processing means 130 and a cutting processing on the first page is performed in the steps S326 and S328.

On the other hand, in the step S318, when it is judged that the plotter 100 stands by, the plotter 100 stands by until an elapsed time after the first page is fed out reaches the stand-by time stored in the memory section 306. In this case, when both of the first page and the second page are fed out in the step S314, respective elapsed times for the first page and the second page are measured in the plotter 100.

After that, the plotter 100 judges whether the elapsed time for the first page reaches the stand-by time of "10 minutes" which is stored in the memory section 306 or not (step S322).

In the step S322, when it is judged that the stand-by time is reached (step S322: Yes), the plotter 100 pulls back the first page (step S324) so that a tip end position (or some reference position) of the first page is moved to a predetermined preparation position in the vicinity of the processing means 130 and a cutting processing on the first page is performed in the steps S326 and S328.

On the other hand, when it is judged that the elapsed time does not reach the stand-by time (step S322: No), the plotter 100 repeatedly executes judgment processing of the step S322 until it is judged that the stand-by time is reached.

Cutting Processing

In the step S326, the plotter 100 performs cutting processing for the first page according to CAD data stored in the memory section 306 (step S326). Next, the plotter 100 cuts out the first page on which the cutting processing is performed in the step S326 from the roll paper 110 (step S328).

After that, the plotter 100 judges whether all cutting processings (for all pages) represented in the CAD data are finished or not (step S330).

In the step S330, it is judged that all cutting processings are finished (step S330: Yes), the plotter 100 finishes the processing.

On the other hand, in the step S330, it is judged that all cutting processings are not finished (step S330: No), the plotter 100 makes the processing return to the step S308.

After that, the plotter 100 repeatedly executes the step S308 through S330 until all cutting processings (for all pages) are finished.

In the above-mentioned description, "first page" and "second page" mean the first page (leading page) and the second page of a plurality of pages on which a cutting processing is not performed yet at a certain time.

Therefore, after a cutting processing for the first page is finished, the second page before the processing becomes to be the "first page" and the "third page" before the processing becomes to be the "second page".

Specific Procedure of Cutting Processing

Next, an example of specific procedures of a cutting processing in the cutting plotter will be described below with reference to FIGS. 4(*a*) through 7.

Figure 4:
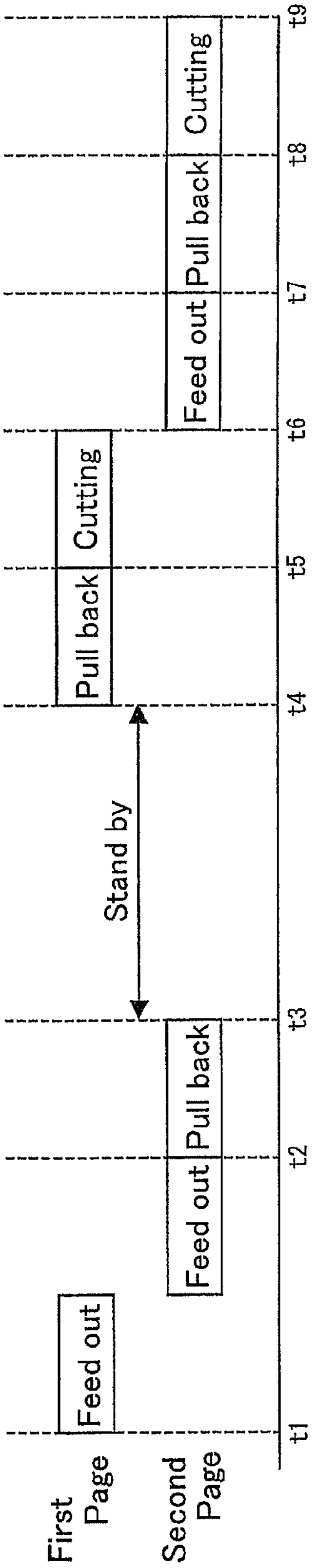
FIGS. 4(*a*) and 4(*b*) are time charts showing specific procedures of cutting processings in various cutting plotters.
Figure 4:
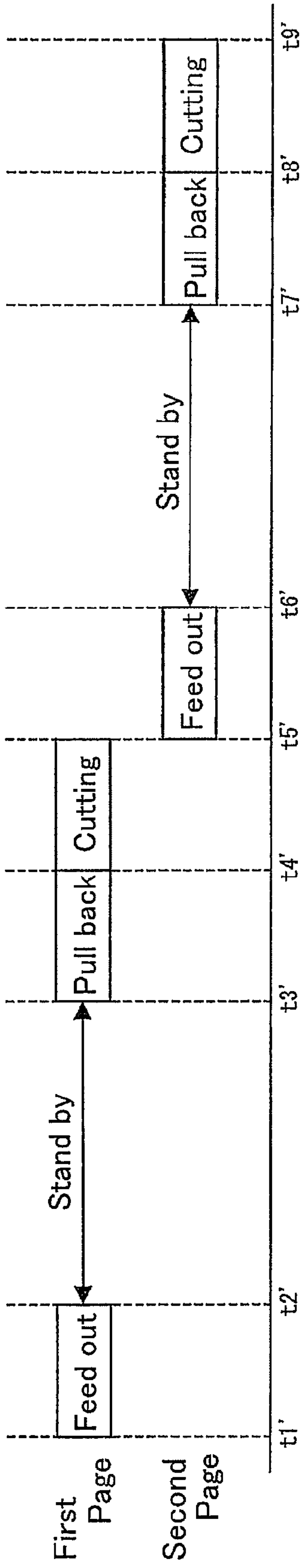

FIGS. 4(*a*) and 4(*b*) are time charts showing specific procedures of cutting processings in various cutting plotters.

FIG. 4(*a*) is a time chart showing a specific procedure of cutting processing in the plotter 100 in accordance with an embodiment of the present invention.

On the other hand, FIG. 4(*b*) is a time chart showing a specific procedure of cutting processing in a conventional cutting plotter.

Figure 5:
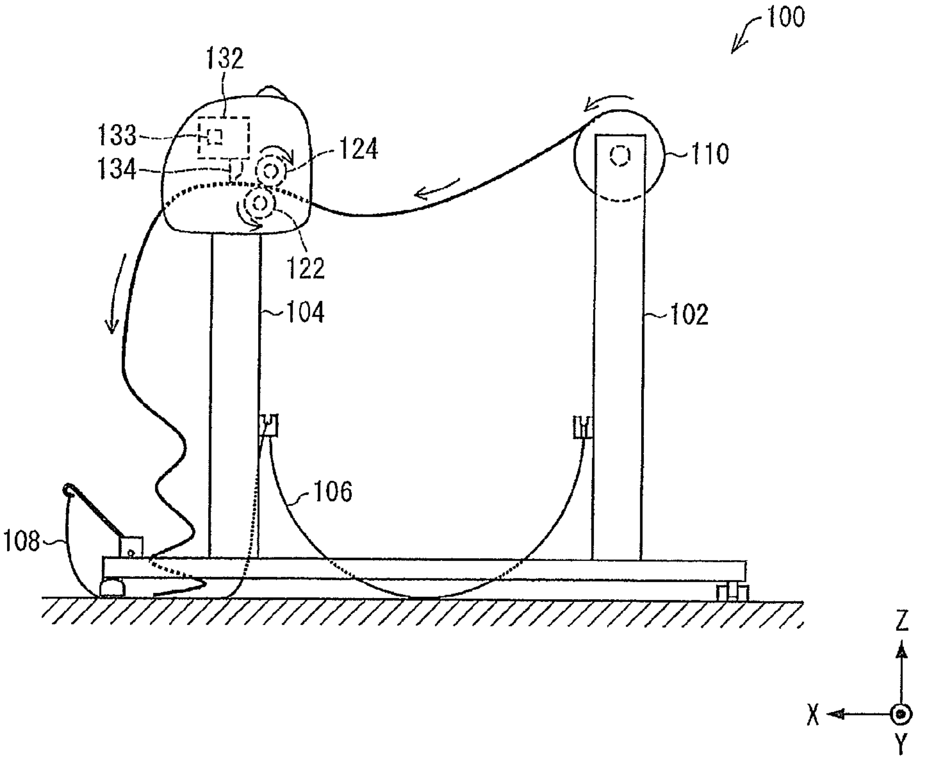
FIG. 5 is a view showing a state of a plotter in accordance with an embodiment of the present invention at the timing "t2" shown in FIG. 4(*a*) (when both of the first page and the second page have been fed out).
Figure 6:
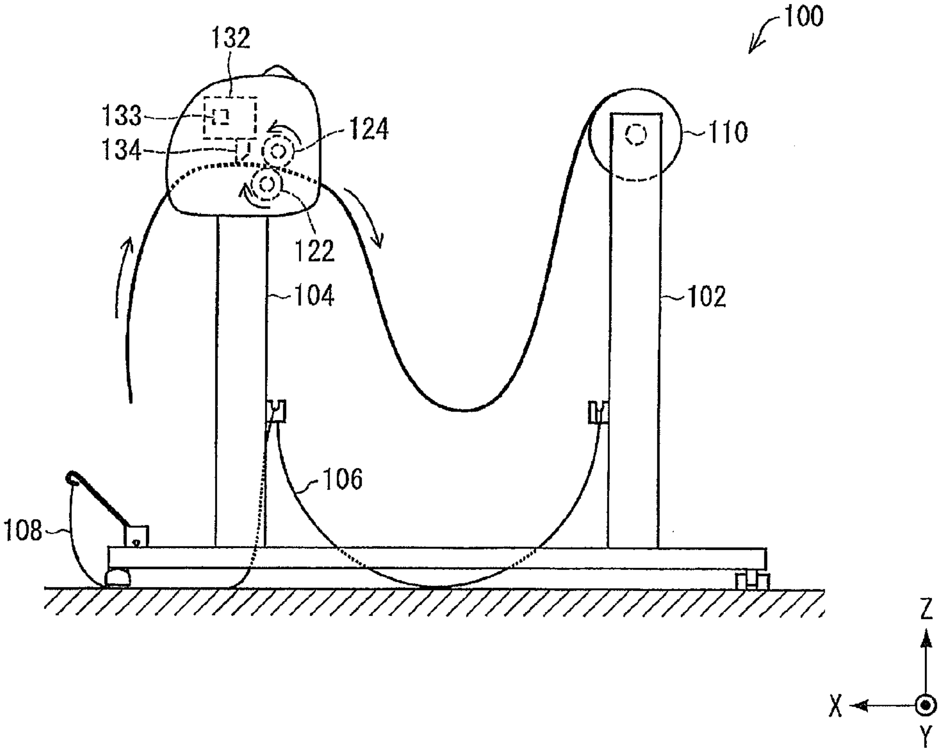
FIG. 6 is a view showing a state of a plotter in accordance with an embodiment of the present invention at the timing "t3" shown in FIG. 4(*a*) (when the second page is pulled back and retreated).
Figure 7:
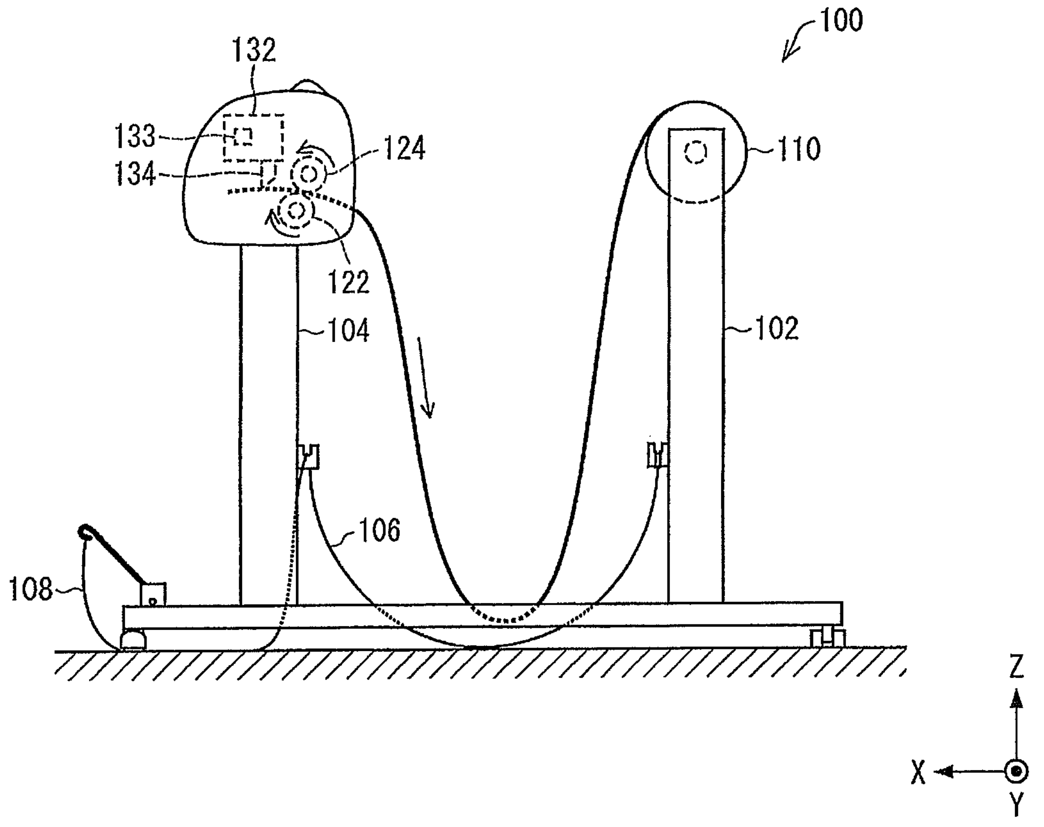
FIG. 7 is a view showing a state of a plotter in accordance with an embodiment of the present invention at the timing "t5" shown in FIG. 4(*a*) (when the first page is pulled back and set in a state that a cutting processing on the first page is capable of being started).

FIGS. 5 through 7 are views showing a state of the plotter 100 in accordance with an embodiment of the present invention.

Especially, FIG. 5 is a view showing a state of the plotter 100 in accordance with an embodiment of the present invention at the timing "t2" shown in FIG. 4(*a*) (when both of the first page and the second page have been fed out).

Further, FIG. 6 is a view showing a state of the plotter 100 in accordance with an embodiment of the present invention at the timing "t3" shown in FIG. 4(*a*) (when the second page is pulled back and retreated).

FIG. 7 is a view showing a state of the plotter 100 in accordance with an embodiment of the present invention at the timing "t5" shown in FIG. 4(*a*) (when the first page is pulled back and set in a state that a cutting processing on the first page is capable of being started).

As shown in FIG. 4(*a*), in the plotter 100 in this embodiment, the first page and the second page of the roll paper 110 are continuously fed out in advance before the processing on the first page is performed (timing "t1" through "t2").

As a result, as shown in FIG. 5, the plotter 100 is set in a state that both of the first page and the second page have been fed out in advance (timing "t2").

In this case, a portion of the roll paper 110 which has been fed out in advance is almost ejected to the outside of the apparatus main body except a portion between the support post 102 and the support post 104. The portion between the support post 102 and the support post 104 is in a slightly slackened state.

After that, the plotter 100 pulls back the second page together with the first page (timing "t2" through "t3").

As a result, as shown in FIG. 6, the first page is still in an ejected state to the outside of the apparatus main body but the second page is in a slackened and retreated state between the support post 102 and the support post 104 without being folded (timing "t3").

After that, the plotter 100 stands by until an elapsed time after the first page is fed out reaches the stand-by time (timing "t3" through "t4").

Next, when the stand-by time is reached, the plotter 100 pulls back the first page (timing "t4" through "t5") and, as a result, as shown in FIG. 7, a leading position of the first page is pulled back to its processing position and most portion of the first page and the second page is in a slackened and retreated state between the support post 102 and the support post 104 (timing "t5").

After that, the plotter 100 performs cutting processing on the first page (timing "t5" through "t6") and, when the cutting processing on the first page is finished (timing t6), since the stand-by time for the second page has been already reached at this time, the plotter 100 is capable of performing cutting processing on the second page successively. However, in a case that there is the third page, as shown in FIG. 4(*a*), it may be structured that the third page is fed out in advance (timing "t6" through "t7") and, in this case, since the second page is also fed out and thus the second page is pulled back to its processing position (timing "t7" through "t8") and, after that, the cutting processing on the second page is performed (timing "t8" through "t9").

As described above, according to the plotter 100 in this embodiment, both of the first page and the second page are fed out before cutting processing on the first page is started. Therefore, most of the stand-by time for the second page is capable of being passed during standing by for the first page and during performing the cutting processing on the first page and thus, after the cutting processing on the first page is finished, cutting processing on the second page can be started successively or without standing by for a long time. Accordingly, deterioration of processing accuracy of the processing apparatus can be prevented without increasing the processing time. Further, the roll paper 110 can be stood by without being folded, folds and wrinkles do not occur in the roll paper 110 and thus the processing accuracy is not lowered.

On the other hand, as shown in FIG. 4(*b*), in a conventional cutting plotter, after cutting processing on the first page is finished (timing "t5'"), the second page is fed out (timing "t5'" through "t6'") and then the second page is stood by (timing "t6'" through "t7'"). Therefore, in the conventional cutting plotter, the stand-by time for the second page is not passed in either of during the stand-by period for the first page and during performing the cutting processing on the first page and thus a very long waiting time is required after the cutting processing on the first page is finished (timing "t5'") and until cutting processing on the second page is started (timing "t8'").

Therefore, in the conventional cutting plotter, different from the plotter 100 in this embodiment, deterioration of processing accuracy of the processing apparatus is unable to be prevented without increasing processing time.

Program and Recording Medium

The respective functions of the control circuit 140 described in the above-mentioned embodiment may be realized by using logic circuits formed on an integrated circuit (IC chip) in a hardware manner or may be realized by using a CPU in a software manner.

For example, the control circuit 140 includes a CPU which executes instructions of programs for realizing respective functions, a ROM which stores the programs, a RAM to which the programs are loaded, and various storage devices (recording medium) such as a memory into which the program and various data are stored. The CPU reads out the programs stored in the various storage devices and executes the programs and thereby the respective functions of the control circuit 140 can be realized.

As the recording medium, for example, tapes such as a magnetic tape or a cassette tape, disks including a magnetic disk such as a floppy (registered mark) disk/a hard disk and an optical disk such as a CD-ROM/an MO/an MD/a DVD/a CD-R, cards such as an IC card (including a memory card)/an optical card, semiconductor memories such as a mask ROM/an EPROM/an EEPROM/a flash ROM, or logic circuits such as a PLD (Programmable logic device) and an FPGA (Field Programmable Gate Array) may be used.

The program may be also supplied to the control circuit 140 through a communication network. The communication network is sufficient as long as the program is transmittable to the control circuit 140 and any type of the communication network may be utilized. For example, as the communication network, the internet, an intranet, an extranet, a LAN, an ISDN, a VAN, a CATV communication network, a VPN (Virtual Private Network), a telephone network, a mobile communication network, a satellite communication network and the like may be utilized.

Further, any type of transmission medium may be used for supplying the program to the control circuit 140. For example, wired communication such as IEEE 1394, USB, power line carrier, cable TV line, phone line and ADSL (Asymmetric Digital Subscriber Line) may be utilized as a transmission medium. Further, wireless transmission medium such as infrared rays such as IrDA and remote control, Blue tooth (registered mark), IEEE 80211 radio, HDR (High Data Rate), NFC (Near Field Communication), DLNA, a cellular phone network, a satellite channel, and a terrestrial digital network may be utilized.

Modified Embodiments

Although the present invention has been shown and described with reference to a specific embodiment, the technical scope of the present invention is not limited to the embodiment described above. Various changes and modifications will be apparent to those skilled in the art from the teachings herein. Embodiments to which the various changes and modifications are applied are included in the technical scope of the present invention. Modified examples in accordance with the embodiment of the present invention will be described below.

Application of the Present Invention

In the embodiment described above, the present invention is applied to a friction type plotter. However, the present invention may be applied to any processing apparatus in which at least a sheet-like medium to be processed is fed out and processed, and processing is not limited to printing and cutting, and a medium to be processed is not limited to a roll paper.

For example, the present invention may be applied to a so-called flat bed type plotter in which a form is cut out by moving the carriage in both directions of an “X”-axis direction and a “Y”-axis direction.

Further, the present invention may be applied to various printing apparatuses such as an inkjet printer or a laser printer in which a sheet-like paper is fed out and printing is performed on the paper having been fed out.

Especially, in a processing apparatus in which a relatively long time is required for processing, for example, in a printing apparatus in which a multicolored printed object is formed by repeatedly performing printing of single colors in one printing region, the processed object is easily affected by deformation of a processing medium due to the environment and thus the present invention is effectively applied to the processing apparatus.

Structure

In the embodiment described above, the control device (control circuit 140) is provided in the inside of the processing apparatus (plotter 100) but the control device may be provided in the outside of the processing apparatus. In other words, the control for the processing apparatus described in the above-mentioned embodiment may be executed from the outside of the processing apparatus.

Processing Range

In the embodiment described above, a page is used as an example in a processing range (range to be processed) in the present invention. However, a processing range in the present invention is not limited to a page and any processing unit for feeding processing and other processing may be utilized.

Over-Feed Operation

In the embodiment described above, in the over-feed operation, the first page and the second page are fed out successively before the processing on the first page is started. However, the second page may be fed out at a timing that a certain time has passed after the first page is fed out.

Further, in the embodiment described above, both of the first page and the second page are fed out before the processing on the first page is started. However, it is sufficient that the second page is fed out at least before the end of the processing on the first page and, for example, the second page may be fed out during processing on the first page. In this case, when the plotter 100 includes the feeding means 120 for feeding the first page during the processing and a second feeding means for feeding out the second page separately from the feeding means 120, the above-mentioned operation can be realized.

Feed Setting

In the embodiment described above, a user sets ON/OFF of the previous feed function, ON/OFF of the over-feed function, the number of pages which are to be previously fed, and a length of page, and a stand-by time as the feed setting.

In these various settings, at least one of the settings may adopt a set value (default value) which is previously set in the plotter 100, may be automatically set depending on various conditions such as a type of paper, a length of page and the environment, may be automatically set depending on processing contents indicated by inputted processing data, or different set values in every page may be set.

<Supplementary Notes>

As described above, a control method in accordance with an embodiment of the present invention is a control method which controls a plotter 100 provided with a feeding means 120 for feeding out a sheet-like roll paper 110 and a processing means 130 for processing the roll paper 110 having been fed out by the feeding means 120. The control method includes a feeding control process which controls the feeding means 120 so that, before the processing means 130 starts processing on one page of the roll paper 110, a plurality of pages including the one page is fed out in advance and then, the page having been fed out in advance is pulled back and retreated at a position on an upstream side with respect to a processing position by the processing means 130, and a processing control process which controls the processing means 130 so that processing of the one page is started when an elapsed time of the one page having been fed out in advance has reached a predetermined stand-by time.

According to this control method, after each of a plurality of pages is fitted to the environment, the processing for the corresponding page is started. Therefore, the corresponding page does not expand and contract due to influence of the environment during the processing on the corresponding page and thus deterioration of processing accuracy of the plotter 100 is prevented.

Especially, in this control method, since a plurality of pages is fed out in advance, another page can be fitted to the environment during one page is processed. In other words, the processing of the one page and fitting of another page to the environment can be performed in a parallel manner. Therefore, since the timing to start processing on another page can be further advanced, increase of a processing time by the plotter 100 can be restrained.

When one page is to be processed, another page having been fed out in advance is required to be retreated somewhere so as not to disturb the processing. However, according to this control method, the page having been fed out in advance can be retreated at a position on an upstream side with respect to the processing position of the processing means 130 by a simple control in which the page having been fed out in advance is pulled back.

As described above, the retreated page at a position on an upstream side is hard to be influenced from the outside of the apparatus during being retreated and thus the roll paper 110 can be maintained in a satisfactory state and deterioration of processing accuracy of the plotter 100 can be prevented.

In addition, according to this control method, the retreated page is not returned to an original state before the page is fed out. For example, when the retreated page is a page having been fed out from a wound portion in a rolled state, the page is not returned to be rewound in a rolled state during being retreated. Therefore, even in a retreated state, the page is continuously exposed to the outside air and the stand-by time has passed.

In the control method described above, it is preferable that, in the feeding control process, the feeding means 120 is controlled so that the page having been fed out in advance is pulled back and retreated in a slackened state without being folded at an upstream position with respect to the processing position of the processing means 130.

Folds and wrinkles may easily occur in the sheet-like roll paper 110 especially when the sheet-like roll paper 110 is folded. According to this structure, since the page is retreated in a slackened state without being folded and thus folds and wrinkles do not occur during the page is retreated.

In the above-mentioned control method, it is preferable that the control method further includes a measurement process in which an elapsed time after the page is fed out in advance in the feeding control process is measured for each of a plurality of pages having been fed out in advance and, in the processing control process, the processing means 130 is controlled so that, for each of a plurality of the pages, when the elapsed time for the corresponding page reaches the stand-by time, the processing on the corresponding page is started.

According to this structure, since an elapsed time is measured for each of a plurality of the pages, the elapsed time after each of a plurality of the pages is fed out in advance can be obtained accurately. For example, even when there is a difference of times when a plurality of pages is fed out or, even when stand-by times for respective pages are different from each other, the elapsed time after being fed out can be obtained accurately for each of a plurality of the pages. Therefore, the excess and deficiency of the stand-by time is not occurred for each of a plurality of the pages and thus the roll paper 110 is prevented from being deformed during processing and is prevented from being wastefully stood by for a long time.

In the above-mentioned control method, it is preferable that the control method further includes a first setting process in which a user sets the stand-by time and, in the processing control process, the processing means 130 is controlled so that, when the elapsed time for the corresponding page reaches the predetermined stand-by time set by the user, processing on the corresponding page is started.

The stand-by time which is required for fitting the roll paper 110 to the environment is varied according to a temperature and humidity of the environment and various conditions such as material, thickness, length and the like of the roll paper 110.

Therefore, according to this structure, a user may set an appropriate stand-by time in consideration of the various conditions. Accordingly, the excess and deficiency of the stand-by time is not occurred and thus the roll paper 110 is prevented from being deformed during processing and is prevented from being wastefully stood by for a long time.

Further, in the above-mentioned control method, it is preferable that the control method further includes a second setting process in which the number of pages fed out in advance in the feeding control process is set by a user and, in the feeding control process, the feeding means 120 is controlled so that the pages are fed out in advance by a predetermined number of pages set by the user.

When the number of pages which are fed out in advance is increased, more pages can be quickly fitted to the environment. However, when the number of pages which are fed out in advance is increased, the total length of the roll paper 110 which is fed out in advance becomes longer. When the total length is too long, the roll paper 110 having been fed out may be folded to cause folds and wrinkles to occur or malfunction in a feeding operation of the paper may be occurred.

In order to prevent this problem, according to this structure, a user can set an appropriate number of pages depending on a shape and a size of space at a standby position for the roll paper 110 having been fed out. Therefore, the total length of the roll paper 110 having been fed out in advance is prevented from being too long and thus the roll paper 110 having been fed out is prevented from being folded to cause folds and wrinldes to occur or malfunction in a feeding operation of the paper is prevented.

Further, in the above-mentioned control method, it is preferable that the control method further includes a third setting process in which a length of a page fed out in advance in the feeding control process is set by a user and, in the feeding control process, the feeding means 120 is controlled so that a page having the length set by the user is fed out in advance.

Even when the number of pages which are fed out in advance is set to be minimized, in a case that a length of the page is too long, the roll paper 110 having been fed out may be folded or the like to occur folds and wrinkles or malfunction in a feeding operation of the paper.

In order to prevent this problem, according to this structure, a user is capable of setting an appropriate length of a page depending on a shape and a size of space at a standby position for the roll paper 110 having been fed out. In this case, the roll paper 110 may be fed out in advance only up to the middle of a page. However, the total length of the roll paper 110 fed out in advance is prevented from being too long and thus the roll paper 110 having been fed out is prevented from being folded or the like and folds and wrinkles and malfunction in a feeding operation of the paper are prevented.

Further, the control circuit 140 in accordance with an embodiment of the present invention is the control circuit 140 which controls the plotter 100 having the feeding means 120 for feeding out a sheet-like roll paper 110 and the processing means 130 for processing the roll paper 110 having been fed out by the feeding means 120. The control circuit 140 includes the feeding control section 302 which controls the feeding means 120 so that, before the processing means 130 starts processing on one page of the roll paper 110, a plurality of pages including the one page is fed out in advance and then, the page having been fed out in advance is pulled back and retreated at a position on an upstream side with respect to a processing position by the processing means 130, and the processing control section 310 which controls the processing means 130 so that processing of the one page is started when an elapsed time of the one page having been fed out in advance has reached a predetermined stand-by time.

According to this control circuit 140, similar effects to the above-mentioned control method can be obtained.

Further, the plotter 100 in accordance with an embodiment of the present invention includes the feeding means 120 for feeding out a sheet-like roll paper 110, the processing means 130 for processing the roll paper 110 having been fed out by the feeding means 120, and the above-mentioned control circuit 140.

According to the plotter 100, similar effects to the above-mentioned control circuit 140 can be obtained.

INDUSTRIAL APPLICABILITY

The present invention is applicable to a processing apparatus and its control in which a processing medium is processed and, especially, the present invention is useful for a processing apparatus and its control in which a sheet-like processing medium that is easy to be deformable depending on the environment is processed.

The invention claimed is:

1. A control method for controlling a processing apparatus provided with a feeding means for feeding out a processing medium in a sheet shape and a processing means for processing the processing medium having been fed out by the feeding means, the control method comprising:

a feeding control process which controls the feeding means so that, before the processing means starts processing on one processing range of the processing medium, a plurality of processing ranges including the one processing range is fed out in advance and then, the processing range having been fed out in advance is pulled back and retreated at a position on an upstream side with respect to a processing position by the processing means; and a processing control process which controls the processing means so that processing of the one processing range is started when an elapsed time for the one processing range having been fed out in advance reaches a predetermined stand-by time, wherein the processing apparatus is a friction type cutting plotter, the processing medium is a paper in the sheet shape, the processing comprises, while pressing a cutting edge of a cutter of the processing means against the paper, feeding out the paper in an X-axis direction and simultaneously moving the cutter in a Y-axis direction to cut out a form directed by processing data from the paper, and the processing data comprise CAD (Computer Aided Design) data stored in a memory section of the processing control means.

2. The control method according to claim 1, wherein, in the feeding control process, the feeding means is controlled so that the processing range having been fed out in advance is pulled back and retreated in a slackened state without being folded at the upstream position with respect to the processing position of the processing means.

3. The control method according to claim 1, further comprising a measurement process in which an elapsed time after the processing range is fed out in advance in the feeding control process is measured for each of a plurality of processing ranges having been fed out in advance, wherein, in the processing control process, the processing means is controlled so that, for each of a plurality of the processing ranges, when the elapsed time for a corresponding processing range reaches the stand-by time, the processing for the corresponding processing range is started.

4. The control method according to claim 1, further comprising a first setting process in which a user sets the stand-by time, wherein, in the processing control process, the processing means is controlled so that, when the elapsed time for the corresponding processing range reaches the predetermined stand-by time set by the user, processing on the corresponding processing range is started.

5. The control method according to claim 1, further comprising a second setting process in which number of processing ranges fed out in advance in the feeding control process is set by a user, wherein, in the feeding control process, the feeding means is controlled so that the processing ranges are fed out in advance by the number of the processing ranges set by the user.

6. The control method according to claim 1, further comprising a third setting process in which a length of the processing range fed out in advance in the feeding control process is set by a user, wherein, in the feeding control process, the feeding means is controlled so that the processing range having the length set by the user is fed out in advance.

7. A processing apparatus comprising:

a feeding means which feeds out a processing medium in a sheet shape;

a processing means which processes the processing medium which is fed out by the feeding means; and a control device comprising:

a feeding control means which controls the feeding means so that, before the processing means starts processing on one processing range of the processing medium, a plurality of processing ranges including the one processing range is fed out in advance and then, the processing range having been fed out in advance is pulled back and retreated at a position on an upstream side with respect to a processing position of the processing means; and a processing control means which controls the processing means so that processing of the one processing range is started when an elapsed time of the one processing range having been fed out in advance reaches a predetermined stand-by time, wherein the processing apparatus is a friction type cutting plotter, the processing medium is a paper in the sheet shape, the processing comprises, while pressing a cutting edge of a cutter of the processing means against the paper, feeding out the paper in an X-axis direction and simultaneously moving the cutter in a Y-axis direction to cut out a form directed by processing data from the paper, and the processing data comprise CAD (Computer Aided Design) data stored in a memory section of the processing control means.

* * * * *